INVENTOR.
JOHN B. GUNN
BY Lester W. Clark
ATTORNEY

United States Patent Office 3,433,974

Patented Mar. 18, 1969

3,433,974
PARAMETRIC COMPUTERS AND METHOD OF OPERATING SAME
John B. Gunn, Yorktown Heights, N.Y., assignor to International Business Machines Corporation, New York, N.Y., a corporation of New York
Filed July 1, 1964, Ser. No. 379,639
U.S. Cl. 307—88 14 Claims
Int. Cl. H03k 3/47

ABSTRACT OF THE DISCLOSURE

Parametric computers composed of parametric oscillator stages, arranged to act either as memory stages or logic stages. The stages are typically arranged in chains. Each parametric oscillator is driven by a pump whose output is periodically disturbed as by a change in phase angle. After each such phase disturbance, each oscillator is sensitive during a transient interval to the presence or absence of an input signal. At the end of the transient interval, the oscillator has settled down into one or the other of two opposed stable phase relations. In the absence of an input signal the stable phase relation of a particular oscillator alternates back and forth between the two stable phase relations at each phase disturbance. Delay lines are introduced between successive oscillators in a chain, and are effective to keep the information moving forwardly along the chain and to prevent it from moving backwardly.

This invention relates to parametric computers, and especially to a method and apparatus for operating such computers to translate binary data by means of a phase disturbance technique.

The patent to Von Neumann, No. 2,815,488, shows a parametric computer comprising a train of non-linear oscillators driven by a pump carrier supply operating at a frequency which is a multiple of the oscillator frequency. Because of the relationship between the pump frequency and the natural frequency of the oscillators, such oscillators are commonly referred to as subharmonic oscillators. Such oscillators and computers are also described in the article by Eiichi Goto entitled, "The Parametron, a Digital Computing Element which Utilizes Parametric Oscillation," appearing in the Proceedings of the IRE for August 1959, pages 1304 to 1316.

A subharmonic oscillator having a resonant frequency and driven by a pump carrier supply operating at some harmonic of that resonant frequency may oscillate stably at its resonant frequency in one of several phase relations with respect to the pump supply. The resonant frequency can be defined as the natural frequency of oscillation of the device in the absence of pump supply. In utilizing such oscillators as computer elements, as proposed by Von Neumann and Goto, the two possible phases of stable oscillation are arbitrarily assigned opposite binary digital significance. That is to say, oscillation in one of the two phases is regarded as a binary "1" and oscillation in the other phase is regarded as a binary "0." In such a computer, the pump supply carrier is turned on and off intermittently, and a new selection of one phase or the other is determined each time the pump supply is turned on, in accordance with the polarity and amplitude of an input signal to the oscillator at the moment when the supply of energy from the pump to the oscillator exceeds the threshold of oscillation.

In a computer constructed according to Von Neumann and Goto, the oscillators are arranged in chains, along which the digital signals are propagated. The pump supply carrier is modulated, i.e., turned on and off intermittently, in three phases, each oscillator being supplied with one phase of modulation only, the phase of the carrier being the same for all the oscillators. The three modulation phases are so established that, for each oscillator in the chain, the beginning of the "on" time of the pump overlaps the end of the "on" time of the preceding oscillator, and the end of the "on" time overlaps the beginning of the "on" time of the following oscillator. At the beginning of each "on" time, oscillation is initiated in a phase determined by the signal or signals from the preceding oscillator or oscillators in the chain. Near the end of each "on" time, the oscillation is transmitted to the next oscillator as an input signal, and there controls the phase of the new oscillation being established there. Since three consecutive oscillators in the chain are never pumped simultaneously, signals can propagate along the chain only in the direction in which the pump "on" time is advanced. After the signal is thus transferred from a preceding oscillator to a following one, the pump supply to the preceding one is cut off for a period somewhat longer than the "on" time, to allow the oscillations substantially to die out. In other words, the oscillations must decay, during each "off" time, to a value small enough so that they will not interfere with the binary indication supplied by the input signal at the time the pump supply next passes the threshold of oscillation. These periods of cutoff of the pump supply to each oscillator limit the speed with which data can be translated down the computer chain. Nevertheless, these cutoff periods are required in the Von Neumann and Goto computers in order to prevent propagation of data in the reverse direction along the computer chain. Furthermore, such a three-phase pump supply is complex and requires careful control of the three phases in order to prevent reverse propagation of signals along the chain.

An object of the present invention is to provide an improved and simplified parametric computer.

Another object is to provide an improved method of operating such a computer for the unidirectional propagation of binary data along chains of parameter oscillators.

Another object is to provide a parametric computer of the type described, including improved and simplified pump carrier supply means for the oscillators.

The foregoing and other objects of the invention are attained in the embodiment of the invention described herein.

As pointed out above, non-linear subharmonic oscillator has several stable states of oscillation, which are characterized by different opposite phase relationships between the induced local oscillations and the pump carrier. If such a subharmonic oscillator is not oscillating in one of its stable states, then, if the pump carrier continues to be supplied, the local oscillations shift in phase and amplitude until one of the stable states is reached.

In accordance with the present invention, the phase relationship between a subharmonic oscillator and its pump is periodically disturbed (e.g., by an instantaneous shift of the pump phase) to establish the subharmonic oscillator in an unstable state, from which it shifts until one of the two stable states appropriate to that pump phase is again reached. The particular stable state that is reached is determined solely by the particular unstable state existing immediately after the phase disturbance. Hence, a selection of that unstable state in effect operates as a selection of the final stable state, which in turn may serve as a determination of a binary significance.

The present invention contemplates two different modes of selection of the unstable state after each phase disturbance. In one mode, the oscillator is intended to be used as a memory device, and hence to retain the same binary significance throughout repeated phase disturbances.

In that mode, hereinafter referred to as the memory mode, the angle of the phase disturbance is the principal factor in the selection of the succeeding unstable state. In the memory mode, it is contemplated that there is typically no input signal received from an external source at the time of a phase disturbance, and that the binary significance of the oscillations does not typically change at a phase disturbance. Of course, when it is desired to write into the memory oscillator a new binary significance, an input signal is provided of sufficient magnitude to override the angle of the phase disturbance.

In the second mode of selection, hereinafter referred to as the logical mode, the oscillator is intended to act as a logical device to distinguish between various combinations of input signals from multiple external sources. In the logical mode, the angle of the phase disturbance is chosen to have no influence on the selection, but the selection is determined only by the net input signal. Each oscillator operating in the logical mode is connected so that it receives an input signal at each instant of phase disturbance, each such instant being an instant of logical decision.

In the case of an oscillator operating in the memory mode, in the absence of input signals, the phase of the local oscillation is changed at each phase disturbance of the pump carrier. In the language of a computer constructed in accordance with the present invention, the binary state of such an oscillator is considered to represent continuously a binary "1" or a binary "0," depending only upon the phase relationship with respect to a certain reference phase which is changed for each phase disturbance of the pump supply.

The same method of binary representation is employed in the logical mode oscillators constructed in accordance with this invention. That is to say, a particular change of phase of the oscillation occurring at a phase disturbance of the pump carrier is defined to represent the maintenance of the same binary indication as that existing before the disturbance, while a different change in phase represents a reversal of the binary significance While this mode of binary representation is unconventional, it is entirely self-consistent within the computer and may be used in the handling of binary data in logic operations.

The determination as to whether a given oscillator is to operate in the memory mode is determined by the relationship between the angle of pump phase disturbance and a characteristic of the oscillator termed herein the separatrix-focal point angle, hereinafter more fully described.

In a computer constructed in accordance with one aspect of the present invention, the logical mode oscillators are connected in chains or networks, and each chain in the computer consists of a plurality of parametric oscillators, connected by a pump supply line and by a signal line. The pump source is connected directly to the oscillator at the output end of the pump supply line and that line extends along the chain in the direction opposite to the flow data. Between each pair of adjacent oscillators there is included in the pump supply line a delay means for delaying the phase of the pump supply by a time, which is ideally one-eighth of the period of the oscillator frequency, although some variation from the ideal is permissible and in fact exists in any practical circuit. Along the signal line there is provided between each pair of oscillators another delay means for delaying the advancing signals by substantially the same time.

The phase relationship between the pump supply carrier and the induced oscillations in each oscillator is periodically and intentionally disturbed, typically by suddenly varying the phase of the pump supply carrier. The angle of phase disturbance in each logical stage of a chain or network may be conveniently equal to the separatrix-focal point angle; however, such angle may be different from the separatrix-focal point angle depending upon the particular operation of the system. In each memory stage, the angle of phase disturbance is substantially different from the separatrix-focal point angle. Each time that the phase relationship is disturbed, the data in the chain moves along the chain from one oscillator to the next. The output and input functions in each oscillator overlap. Just after each phase disturbance, only the input function is important, as it determines the phase of the new oscillations. Just before each phase disturbance, the output function only is important, as it will assist in determining the new phase of the next oscillator in the chain, or network.

As described in greater detail below, an input signal has a maximum effect upon the phase of the initiated oscillations if it is $\pi/2$ radians out of phase with respect to the pre-existing oscillations, and a minimum effect if it is either in phase or $\pi$ radians out of phase.

A chain of oscillators constructed in accordance with the present invention takes advantage of this characteristic to prevent backward flow of data along the chain. Signals flowing forward along a chain connected by delay lines, as specified above arrive at each stage $\pi/2$ radians out of phase with the oscillations existing in that stage, and thus have a maximum effect. Signals flowing backward arrive at each oscillator in phase with its own oscillations, and thus have little or no effect. By virtue of this inherent directionality of data flow in the computer chain, it is unnecessary to turn off the pump supply so as to allow the oscillations to decay below the threshold. While in some modifications to be described below, the pump supply is turned off as a part of the phase shifting operation, it is typically turned on again before the oscillations have died out. Consequently, the data can move faster along the chains than in the computers provided with a three-phase pump supply as described by Von Neumann and Goto.

The foregoing and other objects, features and advantages of the invention will be apparent from the following more particular description of preferred embodiments of the invention, as illustrated in the accompanying drawings.

Figure 5A:
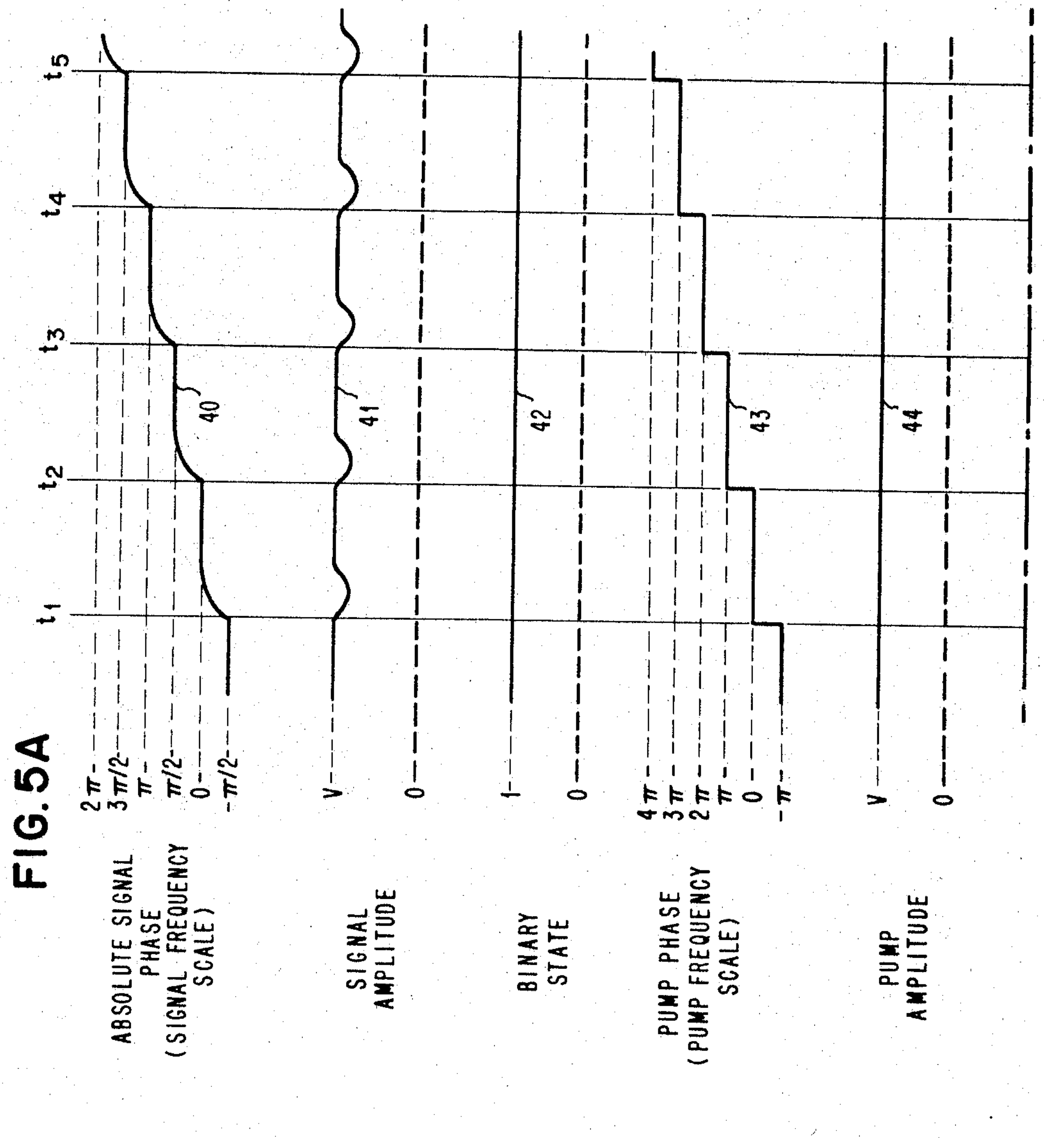
FIG. 5 is a diagram showing how the fragmentary FIGS. 5A, 5B, and 5C fit together.
Figure 5:
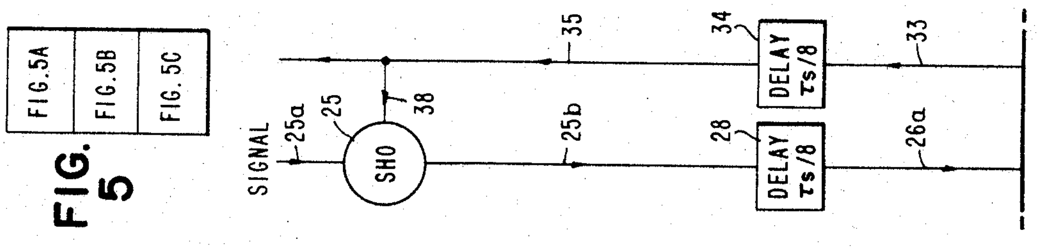
Figure 5B:
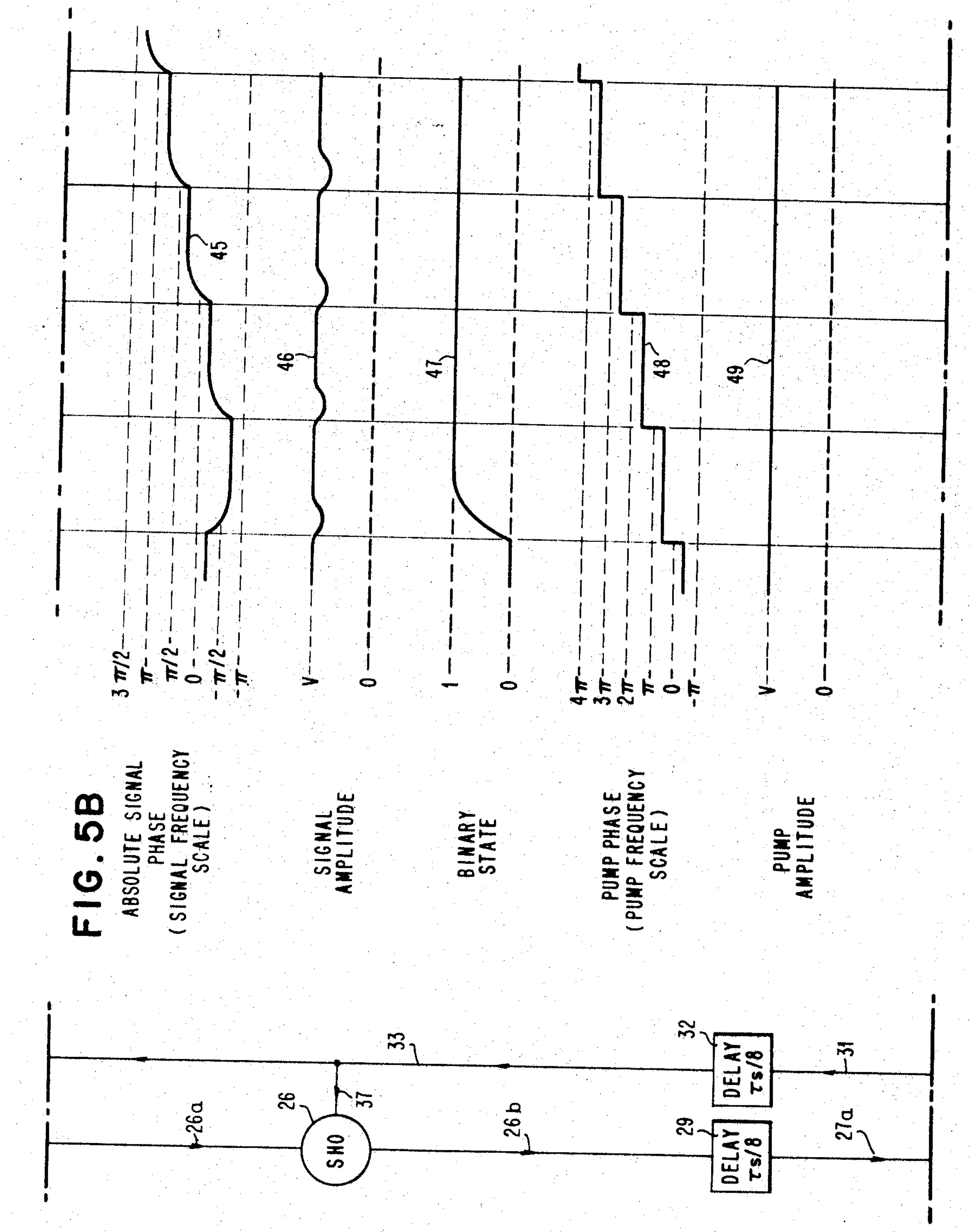
Figure 5C:
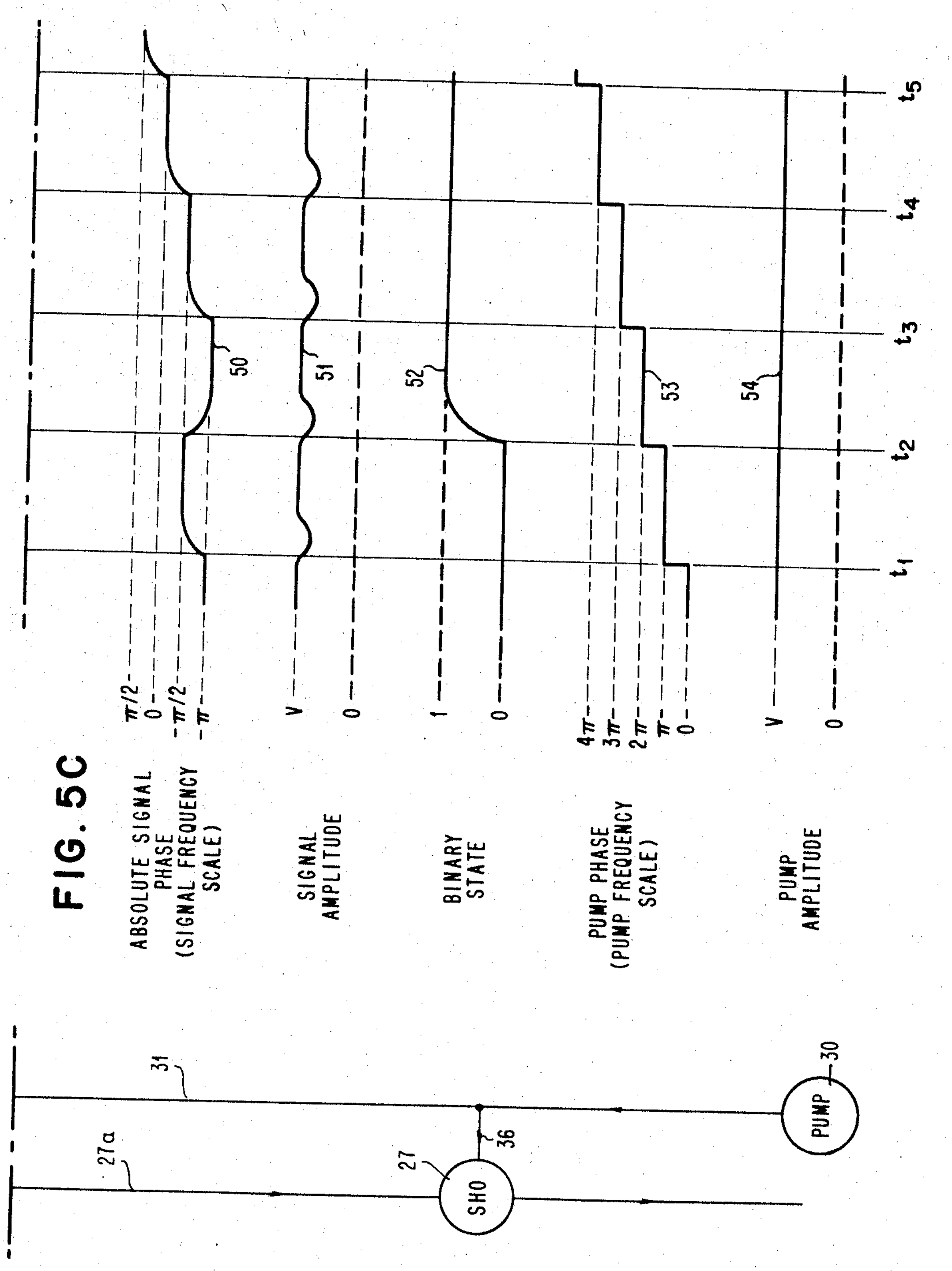
Figure 6:
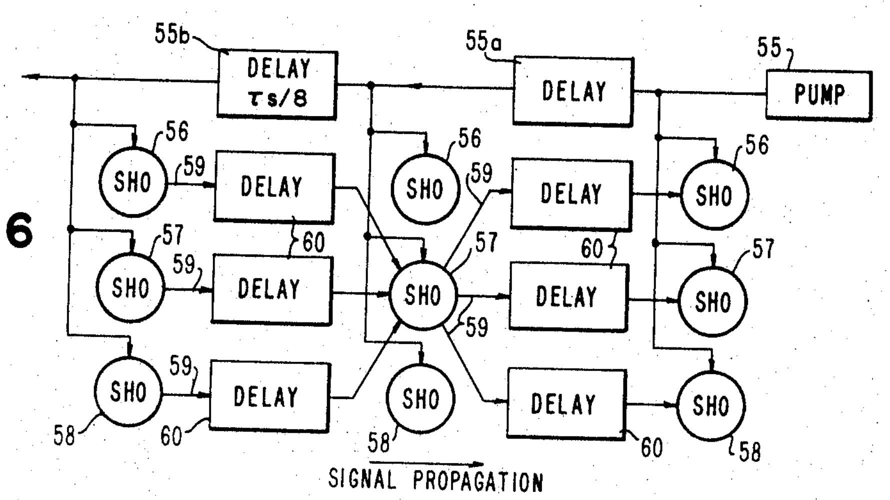
Figure 7:
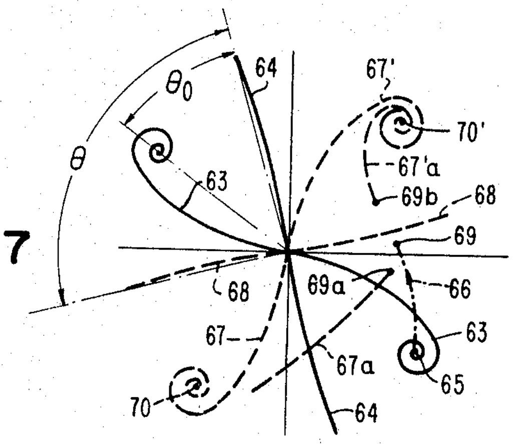
Figure 8:
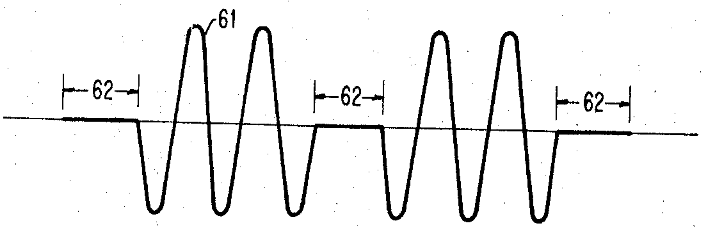
Figure 9:
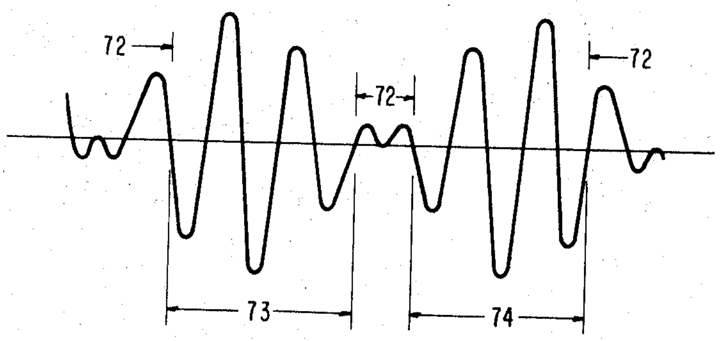

FIGS. 5A, 5B, and 5C, taken together according to the key diagram of FIG. 5, illustrate at their left-hand portions a block diagram of a three-stage computer chain embodying the invention and at their right-hand portions graphs displaying phase variations at successive points along the three-stage chain;

FIG. 6 is a similar block diagram of a more complex form of computer chain;

FIG. 7 is another phase plane diagram illustrating operation of an oscillator utilizing the pump supply of FIG. 8; and FIGS. 8 and 9 are graphical illustrations of alternate pump supply wave forms which may be utilized in place of the pump supply illustrated in FIG. 5B.

FIG. 1

Figure 1:
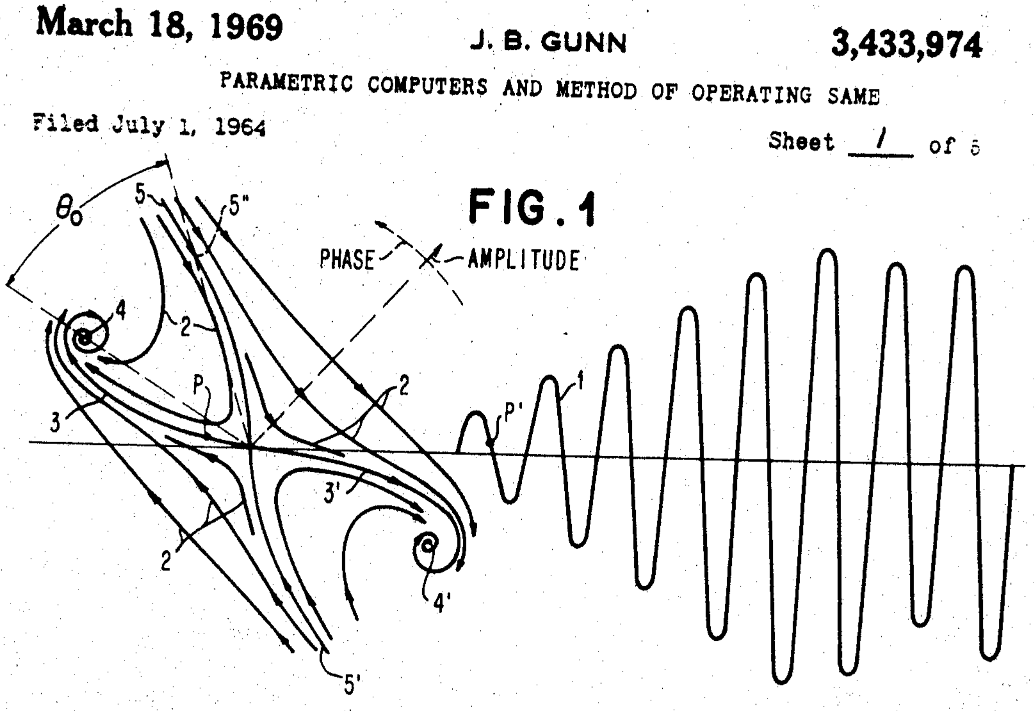
FIG. 1 is a graphical illustration of a phase plane diagram and the relationship of that diagram to the oscillations occurring within an oscillator.

At the right-hand side of FIG. 1, there is shown a conventional curve 1 of potential plotted against time illustrating the operation of a non-linear oscillator at one-half the frequency of the pump supply. The same oscillations are illustrated more completely at the left of FIG. 1 in a phase plane diagram, which is essentially a plot of amplitude and phase in polar coordinates with time as a parameter. Amplitude is plotted as the radial coordinate and phase as the angular coordinate. The use of such diagrams to illustrate is explained in the Goto publication mentioned above and is explained somewhat more completely in "The Theory of Oscillation," by N. Minorsky, published in 1958 by John Wiley and Sons, Inc. as part of a volume entitled, Dynamics and Non-Linear Mechanics.

The lines 2 in the diagram are termed trajectories. Each of the trajectories 2 approaches asymptotically one of two particular trajectories 3, 3' which are called the principal trajectories. The outer ends of the principal trajectories 3, 3' are typically spirals ending at points 4, 4', which are termed "focal points." Theoretically, there exist two trajectories indicated by the lines 5, 5' in FIG. 1, which terminate at the origin rather than at the focal points 4, 4'. These two trajectories together are termed the separatrix and serve as a boundary separating those trajectories which approach the principal trajectory 3 on one side of the origin from those trajectories which approach the opposite principal trajectory 3' on the opposite side of the origin.

To derive the curve 1 from the phase plane diagram, consider that the phase plane diagram in FIG. 1 is rotating about the origin at the oscillator frequency. As it rotates, the operating potential at a particular point in the oscillator circuit is always moving along one of the trajectories toward one of the focal points 4 or 4'. For purposes of illustration, it is assumed that the oscillator is just starting and the point in question is moving along the principal trajectory 3, 3' to the left of the origin. At the instant illustrated, if the point is at the position P on the phase plane diagram, the potential will be at the point P' on the curve 1 at the right-hand side of FIG. 1. Any point in the curve 1 may be said to represent the projection on the vertical axis of a position of the point P in the rotating phase plane diagram. As the point P moves along the principal trajectory 3, and the phase plane diagram rotates, the projection P' moves along the curve 1. It will be recognized that the curve 1 is a somewhat idealized example of the oscillations of a potential in a non-linear oscillator.

In any oscillator, the particular one of the two focal points 4, 4', at which the operating point of the oscillator arrives is determined by the side of the separatrix 5, 5' on which it starts. If it starts on any trajectory at the right-hand side of the separatrix 5, 5', as viewed in FIG. 1, then it reaches focal point 4'. On the other hand, if it starts at any point to the left of the separatrix 5, 5', it will move toward the focal point 4. When the operating point of the oscillator approximates one of the focal points, it has arrived at a substantially steady oscillation. One focal point represents one phase of oscillation, and the other a diametrically opposite phase, separated by $\pi$ radians. The travel along the trajectory describes the transient condition at the beginning of oscillation and before the oscillator settles down to steady state operation.

There is shown in FIG. 1 an angle $\theta_0$ between a line drawn radially from the origin through the focal point 4 and another line drawn from the origin through a point 5'' on the separatrix 5 of equal radius to the point 4. The angle $\theta_0$ is termed in this specification the separatrix-focal point angle. In any non-linear oscillator, the angle $\theta_0$ is inherently always an angle of substantial magnitude, i.e., always greater than about 20°. Furthermore, as far as this invention is concerned, either the angle $\theta_0$ as shown or its supplement may be used with equal facility. Consequently, the angle $\theta_0$ need never be greater than 90°.

Figures 2, 3, 4:
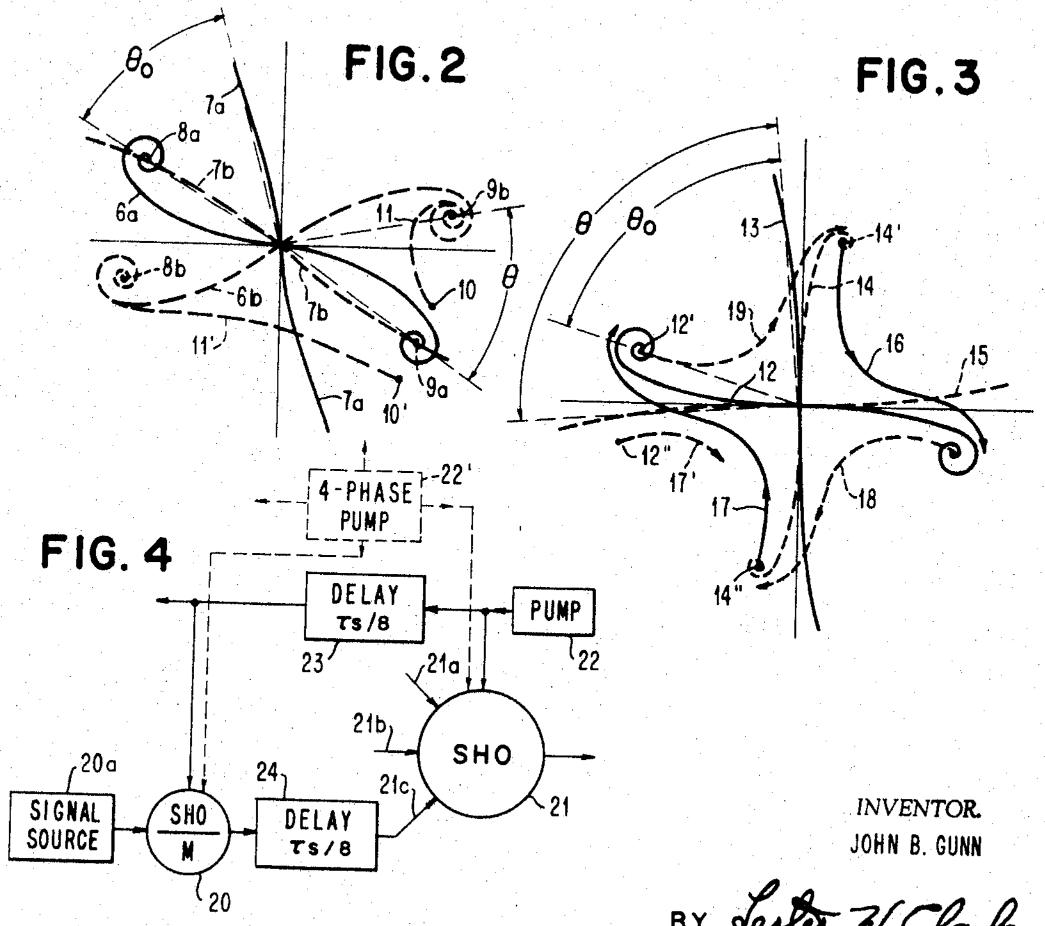
FIG. 2 is another phase plane diagram, illustrating the conditions which exist in an oscillator according to the invention during one of the phase shifts.
FIG. 3 is another phase plane diagram illustrating the operation of an oscillator utilized as a memory element in accordance with the invention.
FIG. 4 is a block diagram illustrating alternative connections of such a memory element to a computer chain.

This angle $\theta_0$ is utilized in the present invention to determine the magnitude of the angle of phase disturbance, cf., angle $\theta$ of FIG. 2, employed periodically. In computing stages, the angle $\theta_0$ is made substantially equal to the angle of phase disturbance. On the other hand, in memory stages, the angle of phase disturbance is made somewhat different from the angle $\theta_0$, as explained more fully below.

The separatrix-focal point angle for any oscillator is determined primarily by the dependence upon the amplitude of oscillation of the resistance, inductance and capacitance of the elements making up the oscillator.

FIG. 2

This figure shows a phase-plane diagram of an oscillator operating in the logical mode at one-half the frequency of the pump supply and under two conditions of pump phase. The effect of a pump change is to rotate the phase-plane diagram through an angle $\theta$ where $\theta$ is equal to half the change in the pump phase. The line 6a shows the principal trajectory and the line 7a shows the separatrix at a time prior to such a phase disturbance. The dotted line 6b shows the same principal trajectory after disturbance and the dotted line 7b shows the separatrix at that time. The focal points prior to the disturbance are at 8a, 9a, and after the disturbance the focal points are at 8b, 9b. The phase disturbance angle $\theta$, for a logical mode oscillator, should be selected so as to place the separatrix of the new oscillations in approximately the same angular positions as the focal points of the old oscillations. In other words, the phase disturbance angle $\theta$ should be substantially the same as the separatrix-focal point angle $\theta_0$.

At the time of a disturbance in phase, the oscillator has been shifted from the focal point 9a either to point 10 or to point 10', by an external input signal. At the moment of the phase disturbance, if the oscillator is operating at the point 10, then after the disturbance it approaches the focal point 9b along the trajectory 11. However, if the oscillator is operating at the point 10', then after the disturbance it approaches the focal point 8b along the trajectory approximately as shown at 11'. Thus, with the oscillator operating at or near the focal point 9a, the application of a small external signal to it is sufficient to move its operating point away from the focal point 9a to one side or the other, i.e., to one of the points 10 or 10'. After the phase shift, the location of that point 10 or 10' with respect to the new separatrix position 7b is effective to determine the new phase relation finally taken up by the oscillator with respect to the phase of the pump source. The focal point 8b now represents one of the stable conditions of oscillation and the point 9b represents the other stable condition of oscillation. The selection between these two stable conditions is determined by the particular location of the operating point 10 or 10' at the time the phase shift took place. That location at 10 or 10' rather than at the old focal point 9a is determined by the input signal at the instant of the phase disturbance. The effect of an input signal in determining which of the focal points 8b or 9b will be approached is at a maximum when the effect of that signal is to move the operating point at right angles to the separatrix and at a minimum when such effect is along the separatrix. Since the separatrix 7b has an approximate radial direction, a maximum effect is obtained when the phase of an incoming signal is 90° different from the existing oscillation 9a.

FIGS. 3 and 4

FIG. 3 is a phase plane diagram illustrating the operation of an oscillator in the memory mode, in a computer constructed in accordance with the present invention. In this mode of operation, as mentioned above, the phase disturbance angle $\theta$ is selected to be substantially different from the separatrix-focal point angle $\theta_0$. In the particular modification illustrated, the angle $\theta$ has been chosen for convenience as 90° or $\pi/2$ radians, whereas the angle $\theta_0$ is about 65°. Thus, when angle $\theta$ is equal to $\pi/2$ radians, the solid line 12 shows a principal trajectory at an initial phase, and, in the absence of an input signal, after every even number of phase disturbances, while the solid line 13 shows the separatrix at the same times. On the other hand, the dotted line 14 shows the principal trajectory and the dotted line 15 shows the separatrix after every odd number of phase disturbances. The solid lines 16 and 17 show the trajectories followed by an oscillator during phase shifts from the focal points on the dotted line principal trajectory 14 to the focal points on the solid line principal trajectory 12. The dotted lines 18 and 19 show the trajectories of the oscillator during phase shifts from the focal points on the solid line principal trajectory 12 to the focal points on the dotted line principal trajectory 14.

The sequence of phase relationships described above is used, in accordance with the present invention, to continuously represent a particular binary quantity, for example "0." In the language of a computer constructed in accordance with the present invention, the signal phase representing the binary "0" is changed at each pump phase disturbance. The representation of a binary "0" as explained above may be translated to a binary "1" at any phase disturbance by the application at that time of a signal having a magnitude large enough to shift the operating condition of the oscillator from the focal point 12' circumferentially of the origin to the point 12'', which lies on the opposite side of the separatrix 15 from the point 12' as shown in FIGURE 3. Consequently, on the next phase disturbance, the oscillator, instead of following the trajectory 19 to the focal point 14', will follow the trajectory 17' and will end at the focal point 14''. After the signal is removed, the oscillations will shift at each phase disturbance, as hereinabove described. At any given instant, the phase of the oscillations, which continuously represent a binary "1" differ in phase through $\pi/2$ radians with respect to the oscillations which at that instant represent a binary "0."

Thus, an oscillator having the characteristics illustrated in the phase plane diagram of FIG. 3 may act as a memory. In such a memory, the signal can be used to write into the memory and change its binary state. Nevertheless, in the absence of an input signal, the oscillator remembers the previously established binary state through an indefinite number of phase disturbances.

The fact that a particular phase may represent a binary "0" at one instant, and a binary "1" at another instant is unconventional, and in fact is entirely contrary to the prior art. It is a distinctive characteristic of the present invention that the phase representing a binary "0" at one instant of logical decision need not be, and in fact is usually not, the same phase representing a binary "0" at the next instant of logical decision. The phase having a given binary significance changes by the angle $\theta$ at each instant of logical decision, in the above illustration, this angle is equal to $\pi/2$.

A memory oscillator is illustrated at 20 in FIG. 4 and is identified by the legend SHO/M. The input of oscillator 20 is supplied at starting with a signal from a suitable source, indicated diagrammatically at 20*a*, which establishes its oscillations in either a binary "0" or a binary "1" phase. The oscillator 20 has its output connected to one input of a subharmonic oscillator 21. Both the oscillators 20 and 21 are driven by a pump 22, the oscillator 20 being driven through a delay line 23. The pump frequency should be a multiple of the resonant frequency of the oscillator, or nearly so. The oscillator 21 has three inputs 21*a*, 21*b*, 21*c* and can be adapted for majority-type logical operations. Referring to FIG. 2, for example, the base of the signal which produces the shift from 9*a* to 10 or 10' can be obtained as a majority function of the respective phases of an odd-numbered plurality of input signals. Memory oscillator 20 drives input 21*c* of oscillator 21 through a delay line 24 so that one input of oscillator 21 is fixed to operate as an AND circuit with respect to inputs 21*a* and 21*b*. For example, if the oscillator 20 is continuously producing an output signal having the binary value "0," then both of the other two inputs 21*a* and 21*b* of the oscillator 21 must have the binary value "1" in order for the oscillator 21 to produce an output signal of "1." Thus a "1" output signal from oscillator 21 shows that both inputs 21*a* and 21*b* are at their "1" states.

The oscillators and memory oscillators constructed in accordance with the present invention may be readily connected to produce other types of majority logic circuits including those described in the Von Neumann patent and the Goto publication cited above.

The delay line 24 introduces a delay of ⅛ of the signal frequency cycle. The delay line 23 also introduces a delay of ⅛ of the signal frequency cycle. If these two delays are so chosen, then the signals arriving at the oscillator 21 from oscillator 20 are in phase quadrature with the local oscillations in the oscillator 21 and thus have a maximum effect on the phase of new oscillations of oscillator 21 at each instant of logical decision. Furthermore, any signals from oscillator 21 which feed back through the delay line 24 to the oscillator 20 arrive either in phase or $\pi$ radians out of phase with the local oscillations in oscillator 20, and thus have a minimum effect.

It is not necessary that the two delays be each exactly ⅛ of a signal cycle ($\pi/4$ radians on the signal frequency scale). That is the ideal relationship, but effective operation can be obtained even though there are some variations from the ideal. Note that the delay in the delay line 23 must be substantially the same as that in the delay line 24 and is approximately ⅛ of the signal frequency cycle. If the delay in line 23 is referred to the pump frequency cycle, then its measure depends upon the particular harmonic of the signal frequency at which the pump operates. In the typical case where the pump operates at the second harmonic of the signal frequency, the delay line 23 is ¼ of the pump frequency cycle. The delay introduced by the delay lines 23 and 24 is independent of the particular harmonic frequency used by the pump and is also independent of the angle of phase disturbance $\theta_0$.

Because of the delay lines 23 and 24, the phases of the pump and signal frequencies are not the same at any two successive oscillators in a chain. This is true whether the binary significances of the local oscillations in the two successive oscillators are the same or opposite. Again, this method of operation is unconventional and contrary to the methods used in the prior art. Nevertheless, as long as the method is self-consistent throughout the computer, it is capable of handling logic operation just as accurately and faster than the methods of the prior art.

An alternate embodiment is shown in FIG. 4 which is particularly adaptable for low frequency operations. A four-phase pump 22', shown in dashed outline, is substituted directly for pump 22 and delay line 23. As illustrated, one output of the pump 22' is connected to the subharmonic oscillator 21; an output of the pump 22' differing in phase by $\pi/2$ is connected to the subharmonic oscillator 20; remaining two-outputs of the pump 22' are connected to additional subharmonic oscillators, not shown, arranged in a chain with respect to the subharmonic oscillator 20. When additional groupings of four subharmonic oscillators are included in the chain, corresponding subharmonic oscillators in each of said groupings are multiplied such that the phase of the pump signals supplied to the corresponding oscillators is the same. The use of four-phase pump 22' simplifies the supplying of low frequency pump signals of different phases to the subharmonic oscillators; the use of delay lines, such as delay line 23, would be cumbersome at low frequencies.

FIGS. 5, 5A, 5B and 5C

These figures illustrate a chain, e.g., a shift register of three oscillators 25, 26, 27, each diagrammatically illustrated by a circle with the legend SHO (subharmonic oscillator). Each of the oscillators may be any suitable non-linear impedance means such as those described by Von Neumann or Goto, or in any of the other extensive literature on parametric computers. The successive oscillators are connected in a signal line including oscillator input connections 25*a*, 26*a*, 27*a* and output connections 25*b*, 26*b*, 27*b*. A delay line 28 connects the output connection 25*b* of oscillator 25, with the input connection 26*a* of the next oscillator 26. Similarly, a delay line 29 connects output connection 26*b* to input 27*a*.

The pump energy is supplied from a pump carrier source 30 connected to a pump carrier supply line including a line section 31, a delay line 32, a line section 33, a delay line 34, and a line section 35. The line sections 31, 33 and 35 are respectively connected through branch lines 36, 37 and 38 to the subharmonic oscillators 27, 26 and 25. Each of the delay lines 28, 29 and 32, 34 is designed to produce a delay approximately equal to ⅛ of the period of the oscillator frequency. Such a delay is indicated by the legend $\tau_s/8$ in the drawing.

There are also illustrated in these figures the variation in amplitude and phase relationships in the pump carrier supply line and the various signal lines. FIG. 5A shows the amplitude and phase relationships associated with oscillator 25. FIG. 5B shows the amplitude and phase relationships associated with oscillator 26, and FIG. 5C shows the amplitude and phase relationships associated with oscillator 27. It is assumed that the pump frequency is the second harmonic of the oscillator (signal) frequency and that $\theta=\theta_0=\pi/2$.

In FIG. 5A, the curve 40 illustrates the variation in absolute phase of the signal oscillations in the oscillator 25. The scale employed is in terms of radians and is based on the signal frequency. The curve 41 shows the variation in signal amplitude. The line 42 shows that the oscillator remains continuously in a condition representing the binary state "1" throughout the period under consideration. The time over which the variations of amplitude and phase are illustrated extends through five instants of logical decision respectively indicated at $t_1$, $t_2$, $t_3$, $t_4$, $t_5$. The intervals between these are long as compared to the period of the pump, so as to allow the local oscillations in each oscillator time to pass through their transient condition and approximate their new stable conditions after each phase disturbance. At each phase disturbance, the absolute phase of the pump is shifted suddenly and discontinuously through $\pi$ radians of the pump frequency. These are the phase disturbances necessary to the operation of the computer, in the modification shown, and define the several instants of logical decision $t_1$ to $t_5$.

The curve 43 illustrates the variations in the pump phase as supplied to the oscillator 25. The scale is also in terms of radians and is based on the pump frequency. The curve 42 shows the binary state of oscillator 25 and indicates that the oscillator 25 remains in the binary "1" state through the period under consideration. The line 44 shows that the pump amplitude remains substantially constant throughout the period under consideration.

In FIG. 5B, the curve 45 shows the variation in the absolute signal phase at the oscillator 26. The line 46 shows that the signal amplitude is substantially constant except for transient variations after each phase disturbance. The curve 47 shows the variations in the binary significance of the oscillation in oscillator 26. Note that the oscillations represent a binary "0" up to the time $t_1$, at which time they are so shifted as a result of the input from SHO 25 as to represent the binary "1" throughout the remainder of the period under consideration. The curve 48 shows the variations in pump phase throughout the period under consideration, and the line 49 shows that the pump amplitude is constant.

In FIG. 5C, the curve 50 shows the variations in the absolute signal phase. The line 51 shows the variation in the signal amplitude. The curve 52 illustrates the change in the binary state represented by the oscillations in the oscillator 27. Note that these oscillations represent a binary "0" up to the time $t_2$ and shift at that instant as a result of an input from SHO 26 so that they thereafter represent a binary "1." The curve 53 shows the variation in pump phase supplied to the oscillator 27. The curve 54 shows that the pump amplitude is substantially constant.

Note that for each oscillator the pump shifts in phase through $\pi$ radians at each of the instants of logical decision $t_1$ to $t_5$. Between each oscillator and the next one along the pump supply line, the delay lines 32 and 34 introduce a time delay of $\tau_s/8$, i.e., ⅛ of the period of the signal oscillation. Since the period of the pump oscillation is equal to one-half that of the signal oscillation, the delay in the lines 32 and 34 is one-fourth of the pump oscillation. If at each of the instants $t_1$–$t_5$, the signal in a given oscillator advances in phase by $\pi/2$ radians, it retains the same binary significance in accordance with the code described with respect to FIG. 3. If on the other hand, it is to shift in binary significance at a particular instant of logical decision, then it retards in phase by $\pi/2$ radians in accordance with this code. Such a retardation in phase is shown at time $t_1$ in the curve 45 illustrating the signal phase for oscillator 26 and also at time $t_2$ in the curve 50, illustrating the signal phase for oscillator 27. At all of the other instants of logical decision illustrated for all three of the oscillators 25, 26 and 27, the oscillators retain the same binary significance and hence advance in phase.

Referring now to the oscillator 25, it may be seen that its oscillations continue to represent a binary "1" throughout the period under consideration. Thus, the phase of the signal oscillations advances by $\pi/2$ radians at each of the instant $t_1$–$t_5$. In the case of the oscillator 26, it should be noted that prior to time $t_1$, its signal oscillations have a phase such as to indicate a binary "0." At time $t_1$, the phase shifts due to the incoming signal from oscillator 25. That incoming signal started from oscillator 25 at a phase $-\pi/2$, as shown in curve 40. The delay in phase of one-eighth of a time period due to delay line 28 caused it to reach the oscillator 26 in a phase $-3\pi/4$. It is effective to control the phase of the new oscillations set up in oscillator 26 after the instant $t_1$ in the corresponding $-3\pi/4$ phase, as shown in curve 45 between the intervals $t_1$ and $t_2$.

Turning now to oscillator 27, it may be seen that at the beginning of the period of observation, the phase of the signal frequency as shown by curve 50 is such as to indicate a binary "0." At time $t_1$, the incoming signal from oscillator 26 where received at the oscillator 27 was at phase $-\pi/2$ (the sum of $-\pi/4$ at the oscillator 26, and $-\pi/4$ in the delay line 29). This input signal controls the phase of the oscillator 27 beginning at instant $t_1$ and shifts it to $-\pi/2$ in the interval between $t_1$ and $t_2$, as shown by curve 50. At time $t_2$, the incoming signal from oscillator 26 is at $-\pi$ (the sum of $-\pi/4$ at oscillator 26 and $-\pi/4$ in the delay line 29), resulting in a shift in the phase of the oscillator 27 to the $-\pi$ phase beginning at instant $t_2$. Thus, it may be seen that the signal of a binary "1" value introduced at the oscillator 25 before time $t_1$ and is further propagated to the oscillator 27 at time $t_2$.

The propagation of signals in the reverse direction is inherently prevented in the system illustrated. Consider, for example, the situation where the oscillations in two successive oscillators have the same binary significance, as is the case of the oscillators 25 and 26 during the time interval $t_2$–$t_3$. The oscillations at oscillator 26 are at this time in the phase $-\pi/4$. As these oscillations propagate in the reverse direction, i.e., toward oscillator 25, they are delayed by delay line 28 by $\pi/4$ radians and thus arrive at the oscillator 25 with a phase of $-\pi/2$ radians. The oscillator 25 is at this time oscillating with a phase of $+\pi/2$ radians. Thus, the two states of oscillations are in exactly opposite phase. The signals arriving in the reverse direction from oscillator 26 are ineffective to change the phase of oscillator 25 at time $t_3$, because they produce, in terms of FIG. 1, a displacement approximately parallel the separatrix 7*b* and are thus ineffective to control the new phase of the oscillator 25 after the phase disturbance at time $t_3$. If, for example, oscillator 25 is oscillating at the focal point 9*a*, then signals from oscillator 26 would have little tendency to shift the oscillations toward either of the points 10 or 10', as shown in FIG. 2, but would rather tend to shift those oscillations radially towards the origin.

Consider, as a furthrr example, an illustration of the conditions existing when two successive oscillators are oscillating in conditions of opposite binary significance, as in the case of oscillators 25 and 26 during the interval preceding the instant $t_1$. The oscillation of oscillator 26 are then at the phase $-\pi/4$ and are delayed in propagation by the delay line 28 through another shift of $-\pi/4$ radians so that they arrive at oscillator 25 at a phase of $-\pi/2$ radians, or exactly in phase with the oscillations then existing. This concurrence in phase of the two oscillations prevents the backward propagating oscillations from having any substantial effect on the new oscillations initiated at oscillator 25 by the phase disturbance at time $t_1$; it is evident that the signals from oscillator 26 would tend to shift the oscillations radially away from the origin.

For any oscillator operating in the logical mode, such as oscillators 25, 26 and 27 of FIG. 5, the periodical disturbance $\theta$ in the phase relationship between the pump and the local oscillation (measured on the oscillation frequency scale) should be substantially equal to the separatrix-focal point angle $\theta_0$. In FIG. 5B, the phase disturbances (shifts in the pump phase) are shown as equal to $\pi$ radians as referred to the pump frequency. Operation of the pump at the second harmonic of the signal frequency (oscillator frequency) is assumed, so that each phase disturbance is $\pi/2$ radians, as referred to the signal frequency. The separatrix-focal point angle of each logical mode oscillator such as 25, 26, 27 must also be approximatelly $\pi/2$ radians. This relationship of approximate equality between the phase disturbance angle and the separatrix-focal point angle must be maintained for any logical stage. A separatrix-focal point angle of $\pi/2$ radians was selected for the oscillators of FIG. 5 in order to conveniently illustrate the invention. Other values of the angle $\theta_0$ could be selected with equal facility providing the phase disturbances $\theta$ are selected to match the angle $\theta_0$.

FIG. 6

This figure illustrates a somewhat more elaborate computer network than the simple chain of FIG. 5. A pump source 55 is shown as driving a network of three successive units, each consisting of three oscillators 56, 57, 58. The three oscillators in the left-hand unit have output lines 59 which are loosely coupled through delay lines 60 to three inputs of the oscillator 57 at the center of the middle unit. The oscillator 57 has three output lines 59 connected through delay lines 60 to the three oscillators 56, 57, 58 of the right-hand group. The input and output connections of the oscillator 57 at the center of the array in FIG. 6 are typical. Many of the input and/or output connections of the other oscillators in the array have been omitted for the purpose of simplifying the drawing. Such an array of oscillators is common in computers of this type to produce various majority logical operations, as described in the Von Neumann patent and the Goto publication mentioned above. Pump source 55 drives the right-hand unit directly, and drives the center unit through a delay line **55*a* and the left-hand unit through another delay line 55*b***.

FIGS. 7–8

This figure is a phase plane diagram which illustrates a different mode of operating a subharmonic oscillator than that discussed with respect to FIG. 5. The phase plane diagram of FIG. 7 illustrates the operation of an oscillator driven by the pump output wave shown in FIG. 8. Referring to that figure, there is shown a pump wave 61 consisting of bursts of pump output cycles of alternating phase, separated by intervals 62 in which the pump output is substantially zero. Although the pump output is indicated as being substantially zero during the intervals 62, it need only be below the threshold of oscillation of the oscillators during those intervals.

In FIG. 7, the curve 63 represents a principal trajectory and the curve 64 represents the separatrix. If the operating point is at the focal point 65 at the instant when the pump is turned off, then during the interval when the pump is off, the operating point coasts along a curve 66. If the pump frequency driving the oscillator is not an exact multiple of the resonant frequency at a given amplitude, the tangent of curve 66 does not pass through the origin and the coasting process produces a change in phase as shown in FIG. 7. If the oscillator were driven at an exact multiple of its resonant frequency, the curve 66 would have a tangent line leading toward the origin. Hence, for this type of operation, the oscillator must be driven so as to oscillate at a frequency slightly different from its resonant frequency. Let the pump be turned on again in such a phase that the principal trajectories are those indicated by the curves 67, 67' and the separatrix is that indicated by the curve 68 and at a time when, in the absence of an external signal, the operating point also lies on the separatrix 68. Then an external signal can shift to one of the positions **69*a*, 69*b*, so that it follows one of the trajectories 67*a*, 67*a'* leading to the focal points 70, 70'. Which of these two points is approached depends, as before, on the phase of the external signal. Consequently, it may be seen that the coasting period 62 and the difference between the resonant and driving frequencies may be adjusted to compensate for a difference in the angles $\theta$ and $\theta_0$. This former difference determines the rate of pulse change during coasting along curve 66**.

While it is easy to obtain $\theta=\pi/2$, it is difficult to achieve $\theta_0=\pi/2$. The described coasting technique obviates the necessity of making $\theta=\theta_0$, as required in the first described system, and simplifies system design. By increasing the amount of coasting, $\theta$ can be made equal to zero which corresponds to switching off the pump supply without shifting the phase of the pump signal. This may be done practically with somewhat more simple circuitry than the discontinuous shift in the pump phase illustrated in FIG. 5.

FIG. 9

This figure illustrates another waveform 71 of pump output, which may be utilized to produce the mode of operation described in connection with FIGS. 7 and 8. The pump output wave 71 consists of two frequencies separated by a difference in frequency which is relatively small as compared to the frequencies themselves. It is well known that two such frequencies will beat together and extinguish each other at intervals, such as the intervals 72 in FIG. 9. Furthermore, it is known that the waveforms between the beat intervals 72 are alternately of opposite phase. That is to say, the curve in the interval 73 as shown in FIG. 9 is $\pi$ radians out of phase with the curve in the interval 74. It should be readily apparent that such a pump supply is adaptable to the driving of an oscillator as described in connection with FIGS. 6 and 7.

The oscillators and memory oscillators constructed in accordance with the present invention may be readily connected to produce other types of logic circuits as described in the Von Neumann patent and the Goto publication cited above.

While I have shown and described certain embodiments of my invention, other modifications thereof will readily occur to those skilled in the art, and I, therefore, intend my invention to be limited only by the appended claims.

What is claimed is:

1. In combination, (a) a parametric oscillator having a resonant frequency;

(b) means for supplying an input signal of given frequency to said oscillator;

(c) pump means for supplying electromagnetic energy to said oscillator at a frequency substantially equal to a multiple of said resonant frequency to induce parametric oscillations in said oscillator having the same frequency as said input signal and a stable phase relation with respect to said pump frequency determined by said input signal and selected from a plurality of phase relations; and (d) means operative periodically to modify the energy supply from the pump means so as to disturb said stable phase relation at times separated by regular intervals long enough as compared to the period of the pump, to allow the oscillations in the impedance means to assume a new stable phase relation after each disturbance.

2. The combination as defined in claim 1 in which said phase relation disturbing means comprises means to change discontinuously the phase of the pump.

3. The combination as defined in claim 1, in which said phase relation disturbing means comprises means to decrease the pump output below the threshold of oscillation of said oscillator for a predetermined interval and thereafter to increase the pump output above said threshold at a time when the pump output is in a new phase relationship with respect to the oscillations in the impedance means.

4. The combination as defined in claim 3, in which said pump output is shifted in phase during said last-mentioned interval.

5. The combination as defined in claim 4, in which said pump output consists of two frequencies differing by a relatively small frequency, and beating together to produce alternate intervals of opposite phase separated by intervals in which the pump output is below the threshold of oscillation of said oscillator.

6. In combination:

(a) a plurality of parametric oscillators, each having substantially the same resonant frequency;

(b) a signal line connecting the oscillators in a chain;

(c) a pump source of electromagnetic energy at a frequency substantially equal to a multiple of said resonant frequency;

(d) means connecting the pump source directly to the oscillator at one end of the chain;

(e) a pump supply line connecting the source to the other oscillators and including, between each pair of oscillators, delay means for retarding the phase of the pump frequency energy supplied to said other oscillators;

(f) signal input means connected to the oscillator at the other end of the chain from the pump source;

(g) said signal line including, between each successive pair of oscillators, delay means for retarding the phase of signals directed therealong;

(h) said pump source, said signal input means and said signal line cooperating to induce oscillations in each of said oscillators near said resonant frequency having a phase relation, with respect to the pump frequency, selected from a plurality of phase relations;

(i) said pump source including phase relation disturbing means operative to disturb said phase relation in each oscillator at intervals long as compared to the period of the pump frequency so as to allow each oscillator to assume a new stable phase relation after each shift, said phase shifting means, said pump supply line and said signal line cooperating to propagate binary data expressed by said phase relations along the chain of oscillators.

7. The combination as defined in claim 6 including:

(a) a memory oscillator having the same resonant frequency as said plurality of oscillators;

(b) a delay line connection between said memory oscillator and said pump supply line for supplying to the memory oscillator pump energy delayed in phase with respect to the energy supplied to one of said plurality of oscillators by substantially one-eighth of the oscillator frequency cycle, said pump energy being effective to induce in said memory oscillator parametric oscillations at the second subharmonic frequency near said resonant frequency and having a phase relation with respect to said pump frequency selected from a set of two-phase relations;

(c) a signal output line connecting the memory oscillator to said one of said plurality of oscillators and including delay means effective to delay the signal from the memory oscillator by substantially one-eighth of the oscillator frequency cycle; and (d) signal input means connected to the memory oscillator and operable selectively at any of said phase disturbances to establish therein one of said set of two-phase relations.

8. A memory device including:

(a) a parametric oscillator having a resonant frequency and a predetermined separatrix-focal point angle;

(b) a pump source of electromagnetic energy at a frequency substantially equal to a multiple of said resonant frequency, said source being connected to said oscillator and effective to induce therein parametric oscillations near said resonant frequency and having a phase relation with respect to the pump frequency selected from a plurality of phase relations;

(c) signal input means connected to the parametric oscillator and operable selectively to establish therein one of said plurality of phase relations having a particular binary significance; and (d) means operative periodically to disturb said established phase relation by an angle substantially different from said separatrix-focal point angle, at intervals long enough as compared to the period of the pump to allow said parametric oscillations to assume after each disturbance a new phase relation determined, in the absence of a signal from the signal input means, only by said phase disturbance angle whereby said oscillator effectively remembers the binary state preceding the phase disturbance.

9. A logical device including:

(a) a parametric oscillator having a resonant frequency and a predetermined separatrix-focal point angle;

(b) a pump source of electromagnetic energy at a frequency substantially equal to a multiple of said resonant frequency, said source being connected to said oscillator and effective to induce therein parametric oscillations near said resonant frequency and having a phase relation with respect to the pump frequency selected from a set of two opposed stable phase relations;

(c) means operative periodically to modify the energy supply from the pump source so as to disturb said particular phase relation by an angle substantially equal to said separatrix-focal point angle, at times separated by regular intervals long enough as compared to the period of said pump source to allow the parametric oscillations in said parametric oscillator to assume after each disturbance one of said two stable phase relations, the particular stable phase relation assumed, in the absence of an input signal, being the opposite of that existing before the disturbance, so that phase relations alternating through successive phase relation disturbances, are indicative of a particular binary significance continuing through said successive disturbances; and (d) signal input means connected to said parametric oscillator and operable at any phase disturbance to establish in the oscillator a phase relation of binary significance opposite to that existing before the disturbance.

10. The method of operating a parametric oscillator, comprising the steps of:

(a) pumping the parametric oscillator with electrical energy at a frequency substantially equal to a multiple of the resonant frequency of the parametric oscillator to establish parametric oscillations therein at a phase selected from a set of two phase relations which are stable with respect to the pump cycle;

(b) periodically modifying the pumping energy to disturb the phase relation between said pump cycle and said parametric oscillations;

(c) said pumping energy cooperating with the resonant frequency of the parametric oscillator and in the absence of an input signal during a transient interval following a disturbance of said phase relation, to establish said parametric oscillations at the other of said two phase relations.

11. The method of operating a parametric oscillator as defined in claim 10 in which the step of disturbing said phase relation is accomplished by altering the phase of the pump energy.

12. The method of operating a parametric oscillator as defined in claim 10 in which the step of disturbing said phase relation is accomplished by interrupting the supply of said pump energy.

13. The method of operating a parametric oscillator as a memory device, comprising the steps of:

(a) pumping the oscillator with electrical energy at a frequency substantially equal to the multiple of the resonant frequency of the parametric oscillator to establish parametric oscillation therein at a phase selected from two opposed phase relations stable with respect to the pump cycle;

(b) periodically modifying the pumping energy to disturb the stable phase relation between said parametric oscillation by introducing a phase disturbance angle substantially diffierent from the separatrix-focal point angle of said parametric oscillator;

(c) said pumping energy and the oscillator resonant frequency cooperating in the absence of an input signal, and after a transient interval, to establish said parametric oscillations at the other of said two phase relations; and (d) applying an input signal to said oscillation during selected transient intervals to establish the opposite one of said two phase relations for said parametric oscillations.

14. The method of operating a parametric oscillator as a logic device, comprising the steps of:

(a) pumping the oscillator with electrical energy at a frequency substantially equal to a harmonic of the resonant frequency of the parametric oscillator to establish parametric oscillations therein at a phase selected from a first of two opposed phases stable with respect to the pump cycle;

(b) periodically modifying the pumping energy to disturb the phase relation between the pump cycle and the parametric oscillations by introducing a phase disturbance angle substantially equal to the separatrix-focal point angle of said parametric oscillator; and (c) introducing an input signal into said parametric oscillator concurrently with said phase disturbance, said input signal and the pumping energy cooperating with the resonant frequency of the oscillator to establish said parametric oscillator at the other of said two opposed phases.

References Cited

UNITED STATES PATENTS

| | | |
|---|---|---|
| 2,999,987 | 9/1961 | Li. |
| 2,992,398 | 7/1961 | Sterzer. |

TERRELL W. FEARS, *Primary Examiner.*